(No Model.)
G. A. ANDERSON.
SPRINGLESS HOSE AND NOZZLE COUPLING.
No. 582,611. Patented May 18, 1897.
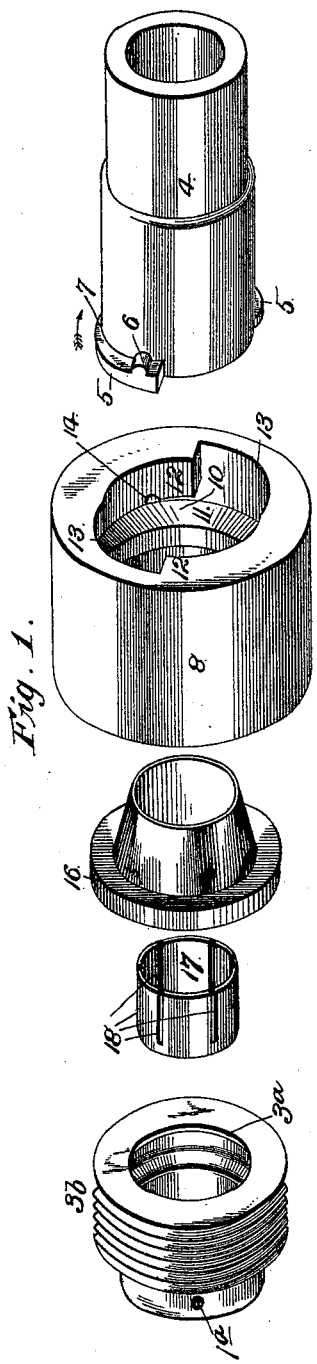
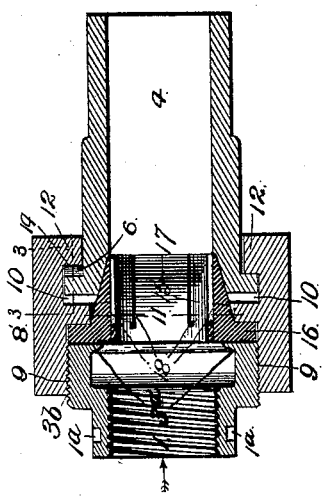
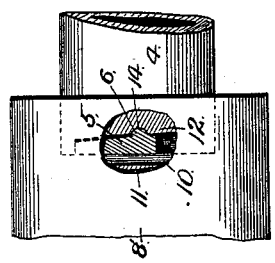
Witnesses:
Inventor:
G. A. Anderson
By Higdon & Higdon
Attys.

UNITED STATES PATENT OFFICE.

GUSTAF A. ANDERSON, OF OTTAWA, KANSAS.

SPRINGLESS HOSE AND NOZZLE COUPLING.

SPECIFICATION forming part of Letters Patent No. 582,611, dated May 18, 1897.

Application filed September 28, 1895. Serial No. 563,951. (No model.)

*To all whom it may concern:*

Be it known that I, GUSTAF A. ANDERSON, of Ottawa, Franklin county, Kansas, have invented certain new and useful Improvements in Springless Hose and Nozzle Couplings, of which the following is a full, clear, and exact description, reference being had to the accompanying drawings, forming a part thereof.

My invention relates to hose-couplings, and more particularly to an improvement in hose-couplings upon which a patent was granted to me March 19, 1895, No. 535,880. In said coupling a spring and catch was employed to secure the connection.

The object of my present invention is to do away with this spring and catch, and consequently simplify and lessen the number of parts employed, and at the same time produce a stronger and more durable and inexpensive coupling.

To this end the invention consists in certain novel and peculiar features of construction and organization of parts, as hereinafter described, and pointed out in appended claim.

In order that the invention may be fully understood, reference is to be had to the accompanying drawings, in which—

Figure 1 represents a perspective view showing all of the parts of the coupling detached from each other. Fig. 2 is a longitudinal sectional view of the coupling with the parts in their proper relative positions; and Fig. 3 is an elevation, partly broken away in order to disclose more clearly the method of fastening the coupling-sections together, on the line 3 3 of Fig. 2.

In said drawings like reference-numerals refer to corresponding parts.

1 designates a short pipe-section, to one end of which hose of varying diameters may be attached. At its opposite end, which is preferably enlarged, it is provided with an integral flange 3ª and external screw-threads 3ᵇ.

4 designates a second pipe-section, which is adapted to be attached to another section of hose, and in diameter preferably corresponds to the section 1. Said section 4 is provided externally at diametrically opposite points with the lugs or ears 5, which are tapered at one end, as shown at 7, and are also wedge-shaped, having their outer sides or faces tapered toward the rounded end 7, for a purpose which will hereinafter appear. Upon said tapered or cam faces of the lugs, near their opposite ends, are the teeth or offsets 6. The tapered or diminished end of each lug is adjacent to the abrupt end of the other. The passage of said section is flared at one end, as shown at 4ª.

8 designates the middle section of the coupling-nut, which may be cylindrical in form, as shown, or externally angular, if desired, and the passage of said nut is internally screw-threaded at one end, as shown at 9, and is cylindrically smooth at its opposite end, as shown at 10, and said screw-threaded and smooth surfaces 9 and 10, respectively, are separated by an inwardly-projecting annular flange or shoulder 11. At the end of the coupling-nut provided with the cylindrical passage 10, at diametrically opposite points, the segmental shoulders 12 project inwardly for a suitable distance, so as to be apart a distance slightly exceeding the diameter of the section 4 of the coupling. These shoulders are of such length that the distance between their contiguous or adjacent ends slightly exceeds the length of the lugs 5, hereinbefore described, so as to form cavities or recesses 13, corresponding approximately in contour with said lugs. At diametrically opposite points cavities 14 are formed in the inner faces of the lugs 12 and are adapted to receive the teeth or offsets 6, as is hereinafter more particularly explained.

15 designates a packing-ring, of rubber or equivalent material, which corresponds in diameter internally to the coupling 4. Externally said ring is frustum-shaped, as shown, and corresponds to the angle of the beveled or flared end 4ª of the section 4. Said packing-ring is also provided at one end with an annular outwardly-projecting flange 16, which corresponds externally to the diameter of the passage 10.

17 designates a metallic bushing, which is of cylindrical form and corresponds in external diameter to the internal diameter of the packing-ring and the section 4. Said bushing is provided with a series of slits 18 and is of spring metal, so as to adapt itself and fit tightly and snugly in its proper position, hereinafter referred to.

To properly assemble these several parts in their relative positions in order to couple two sections of hose together, the packing-ring 15, of elastic material, is slipped within the coupling-nut 8 and fitted against the annular flange 11, as shown in Fig. 2. The section 1 is now screwed into place with its external threads $3^b$ engaging the internal threads 9 of the coupling-nut until it bears tightly against the flange of the packing-ring. The section 4 is now arranged with the lugs 5 in longitudinal alinement or registering with the correspondingly-contoured cavities or recesses 13 of the coupling-nut and is then slipped within said coupling-nut until its end bears against the opposing end of the packing-ring. It is then turned or twisted in the direction indicated by the arrow, Fig. 1, in order that the cam-faces of the lugs may travel upon the correspondingly-inclined inner faces of the shoulders 12, as shown most clearly in Fig. 3. This operation of course causes said section to move farther into the coupling-nut, and consequently compress the elastic packing-ring. When the coupling-section has been turned or twisted about forty-five degrees, the teeth or offsets 6 register with and are forced into the cavities 14 by the action of said packing-ring, which thus hold said coupling-section in operative position with a yielding pressure. This construction provides an absolutely water-tight and at the same time a simple, durable, and inexpensive coupling. As the packing-ring, however, is exposed to the action of the water and the sand or other foreign substance carried by the water, which would tend in a short time to injure or wear out said packing-ring, I employ the cylindrical bushing, which is arranged as also shown in Fig. 2, and is of spring metal and fits tightly, in order to prevent the water, when traveling in the direction indicated by the arrow in said figure, forcing it out of position. To uncouple, the section 4 is grasped and first pushed inwardly, to disengage the teeth or offsets 6 from the cavities 14, and then turned in the direction opposite to that indicated by the arrow, Fig. 1, until the lugs 5 again register with the cavities or recesses 13, when it may be slipped out of engagement with the coupling-ring.

In order that section 1 may be easily disconnected from the coupling-nut, I preferably form it with holes or apertures at diametrically opposite points, as shown at $1^a$, to be engaged by a wrench of any suitable construction.

From the above description it will be apparent that I have produced a coupling which will be effective in an air-pipe or liquid-pipe system and which in effect amounts to a springless hose-pipe coupling.

Having thus described my invention, what I claim as new, and desire to secure by Letters Patent, is—

A hose-coupling, comprising a cylindrical nut having an internal annular flange 11, and shoulders 12, provided with notches 14 at their inner side, a pipe-section, provided with lugs fitting snugly between said flange 11 and shoulders 12, and having teeth which engage the notches 14, a gasket of rubber, projecting into said pipe-section and provided with an annular flange 16 which bears against the flange 11, a split thimble of spring metal fitting tightly in said gasket, and a second pipe-section screwed into the opposite end of said nut and forcing the flange of said gasket tightly against the flange 11, substantially as shown and described.

In testimony whereof I affix my signature in presence of two witnesses.

GUSTAF A. ANDERSON.

Witnesses:
HOWARD MEYER,
BENJ. OLSON.